United States Patent
Price et al.

(10) Patent No.: US 7,105,140 B2
(45) Date of Patent: Sep. 12, 2006

(54) DESULFURIZATION COMPOSITIONS

(75) Inventors: Ashley G. Price, Overland Park, KS (US); Jason J. Gislason, Bartlesville, OK (US); Glenn W. Dodwell, Bartlesville, OK (US); Robert W. Morton, Bartlesville, OK (US); George D. Parks, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/090,343

(22) Filed: Mar. 4, 2002

(65) Prior Publication Data

US 2003/0166464 A1  Sep. 4, 2003

(51) Int. Cl.
*C01B 33/26* (2006.01)

(52) U.S. Cl. .................... 423/327.1; 502/407
(58) Field of Classification Search ........... 423/599, 423/600, 327.1, 605, 625, 628; 502/324, 502/325, 400, 407, 414
See application file for complete search history.

(56) References Cited

U.S. PATENT DOCUMENTS

| 3,715,247 | A | * | 2/1973 | Wade ..................... 149/21 |
|---|---|---|---|---|
| 4,078,004 | A | * | 3/1978 | Schlaefer et al. ........... 568/479 |
| 5,134,108 | A | * | 7/1992 | Thakur et al. .............. 502/318 |
| 5,157,201 | A | | 10/1992 | Norris |
| 5,281,445 | A | | 1/1994 | Khare |
| 5,710,089 | A | | 1/1998 | Khare |
| 5,726,117 | A | | 3/1998 | Khare et al. |
| 5,776,331 | A | | 7/1998 | Khare et al. |
| 5,780,001 | A | | 7/1998 | Khare et al. |
| 5,914,288 | A | | 6/1999 | Turk et al. |
| 5,948,726 | A | * | 9/1999 | Moskovitz et al. ......... 502/415 |
| 5,958,830 | A | | 9/1999 | Khare et al. |
| 5,990,372 | A | | 11/1999 | Blankenship et al. |
| 6,150,300 | A | | 11/2000 | Khare et al. |
| 6,184,176 | B1 | * | 2/2001 | Khare ....................... 502/407 |
| 6,193,877 | B1 | | 2/2001 | McVicker et al. |
| 6,221,240 | B1 | | 4/2001 | Klein et al. |
| 6,245,221 | B1 | | 6/2001 | Baird, Jr. et al. |
| 6,271,173 | B1 | | 8/2001 | Khare |

* cited by examiner

*Primary Examiner*—Edward M. Johnson
(74) *Attorney, Agent, or Firm*—Bronwyn A. Welvaert

(57) ABSTRACT

A composition comprising manganese oxide and a promoter, wherein at least a portion of the promoter is present as a reduced valence promoter and methods of preparing such composition are disclosed. The thus-obtained composition is employed in a desulfurization zone to remove sulfur from a hydrocarbon stream.

17 Claims, No Drawings

DESULFURIZATION COMPOSITIONS

FIELD OF THE INVENTION

This invention relates to the removal of sulfur from hydrocarbon streams. In another aspect, this invention relates to compositions suitable for use in the desulfurization of fluid streams of cracked gasolines and diesel fuels. A further aspect of this invention relates to processes for the production of compositions for use in the removal of sulfur bodies from fluid streams of cracked gasolines and diesel fuels.

BACKGROUND OF THE INVENTION

The need for cleaner burning fuels has resulted in a continuing world-wide effort to reduce sulfur levels in hydrocarbon streams such as gasoline and diesel fuels. The reduction of sulfur in such hydrocarbon streams is considered to be a means for improving air quality because of the negative impact the sulfur has on performance of sulfur sensitive items such as automotive catalytic converters. The presence of oxides of sulfur in automotive engine exhaust inhibits and may irreversibly poison noble metal catalysts in the converter. Emissions from an inefficient or poisoned converter contain levels of non-combusted, non-methane hydrocarbons, oxides of nitrogen, and carbon monoxide. Such emissions are catalyzed by sunlight to form ground level ozone, more commonly referred to as smog.

Thermally processed gasolines such as, for example, thermally cracked gasoline, visbreaker gasoline, coker gasoline and catalytically cracked gasoline (hereinafter collectively referred to as "cracked gasoline") contain, in part, olefins, aromatics, sulfur, and sulfur containing compounds. Since most gasolines, such as, automobile gasolines, racing gasolines, aviation gasolines, boat gasolines, and the like contain a blend of, at least in part, cracked gasoline, reduction of sulfur in cracked gasoline will inherently serve to reduce the sulfur levels in most gasolines, such as, for example, automobile gasolines, racing gasolines, aviation gasolines, boat gasolines, and the like.

The public discussion about gasoline sulfur has not centered on whether or not sulfur levels should be reduced. A consensus has emerged that lower sulfur gasoline reduces automotive emissions and improves air quality. Thus, the rules to date have focused on the required level of reduction, the geographical areas in need of lower sulfur gasoline, and the time frame for implementation.

As the concern over the impact of automotive air pollution continues, it is clear that further effort to reduce the sulfur level in automotive fuels will be required. While the current gasoline products contain about 330 parts per million (ppm) sulfur, the US Environmental Protection Agency recently issued regulations requiring the average sulfur content in gasoline to be less than 30 ppm average with an 80 ppm cap. By 2006, the standards will effectively require every blend of gasoline sold in the United States to meet the 30 ppm level.

In addition to the need to be able to produce low sulfur content automotive fuels, there is also a need for a process which will have a minimal effect on the olefin content of such fuels so as to maintain the octane number (both research and motor octane number). Such a process would be desirable since saturation of olefins greatly affects the octane number. Such adverse effect on the olefin content is generally due to the severe conditions normally employed, such as during hydrodesulfurization, to remove thiophenic compounds (such as, for example, thiophenes, benzothiophenes, alkyl thiophenes, alkylbenzothiophenes, alkyl dibenzothiophenes and the like) which are some of the most difficult sulfur containing compounds to remove from cracked gasoline. In addition, there is a need to avoid a system wherein the conditions are such that the aromatic content of the cracked gasoline is lost through saturation. Thus, there is a need for a process which achieves desulfurization and maintains the octane number.

In addition to the need for removal of sulfur from cracked gasolines, there is a need for the petroleum industry to reduce the sulfur content in diesel fuels. In removing sulfur from diesel fuels by hydrodesulfurization, the cetane is improved but there is a large cost in hydrogen consumption. Such hydrogen is consumed by both hydrodesulfurization and aromatic hydrogenation reaction.

Thus, there is a need for a desulfurization process without a significant consumption of hydrogen so as to provide a more economical process for the treatment of cracked gasolines and diesel fuels.

As a result of the lack of success in providing a successful and economically feasible process for the reduction of sulfur levels in cracked gasolines and diesel fuels, it is apparent that there is a need for a better process for the desulfurization of such hydrocarbon streams which has minimal effect on octane levels while achieving high levels of sulfur removal.

Traditionally, compositions used in processes for the removal of sulfur from hydrocarbon streams have been agglomerates used in fixed bed applications. Because of the various process advantages of fluidized beds, hydrocarbon streams are sometimes processed in fluidized bed reactors. Fluidized bed reactors have advantages over fixed bed reactors, such as, for example, better heat transfer and better pressure drop. Fluidized bed reactors generally use reactants that are particulate. The size of these particulates is generally in the range of from about 1 micron to about 1000 microns. However, the reactants used generally do not have sufficient attrition resistance for all applications. Consequently, finding a composition with sufficient attrition resistance that removes sulfur from these hydrocarbon streams and that can be used in fluidized, transport, moving, or fixed bed reactors is desirable and would be a significant contribution to the art and to the economy.

SUMMARY OF THE INVENTION

It is thus an object of the present invention to provide novel compositions that can be used for the removal of sulfur from hydrocarbon streams.

Another object of the present invention is to provide processes for the production of novel compositions which are usable in the desulfurization of hydrocarbon streams.

Another object of the present invention is to provide a process for the removal of sulfur from hydrocarbon streams which minimizes the consumption of hydrogen and the saturation of olefins and aromatics contained in such streams.

A still further object of the present invention is to provide a desulfurized cracked gasoline that contains less than about 100 ppm, preferably less than 50 ppm, of sulfur based on the weight of the desulfurized cracked gasoline, and which contains essentially the same amount of olefins and aromatics as are in the cracked gasoline from which such desulfurized cracked gasoline was made.

This invention includes a novel composition suitable for use in desulfurizing hydrocarbons. The novel composition comprises:

a) manganese oxide; and b) a promoter wherein at least a portion of the promoter is present as a reduced valence promoter.

The invention further includes another novel composition suitable for use in desulfurizing hydrocarbons. The novel composition comprises: a) manganese oxide; b) a silicon-containing material; c) an aluminum-containing material selected from the group consisting of alumina, aluminate and combinations thereof; and d) a promoter wherein at least a portion of the promoter is present as a reduced valence promoter.

This invention also includes a novel process for the production of the inventive composition comprising:

a) admixing: 1) a liquid, 2) manganese oxide, 3) a silicon-containing material, 4) alumina, and 5) a promoter so as to form a mixture thereof;

b) drying the mixture so as to form a dried mixture;

c) calcining the dried mixture so as to form a calcined mixture;

d) reducing the calcined mixture with a suitable reducing agent under W suitable conditions to produce a composition having a reduced valence promoter content therein, and e) recovering the composition.

This invention further includes another novel process for the production of the inventive composition comprising:

a) admixing: 1) a liquid, 2) manganese oxide, 3) a silicon-containing material, and 4) alumina so as to form a mixture thereof;

b) drying the mixture so as to form a dried mixture;

c) calcining the dried mixture so as to form a calcined mixture;

d) incorporating a promoter onto or into the calcined mixture so as to form a promoted mixture;

e) drying the promoted mixture so as to form a dried promoted mixture;

f) calcining the dried promoted mixture so as to form a calcined promoted mixture;

g) reducing the calcined promoted mixture with a suitable reducing agent under suitable conditions to produce a composition having a reduced valence promoter content therein; and h) recovering the composition.

This invention still further includes a process for the removal of sulfur from a hydrocarbon stream comprising:

a) contacting the hydrocarbon stream with a composition comprising manganese oxide, and a promoter wherein at least a portion of the promoter is present as a reduced valence promoter in an amount which will effect the removal of sulfur from the hydrocarbon stream in a desulfurization zone under conditions such that there is formed a desulfurized hydrocarbon stream and a sulfurized composition;

b) separating the desulfurized hydrocarbon stream from the sulfurized composition thereby forming a separated desulfurized hydrocarbon stream and a separated sulfurized composition;

c) regenerating at least a portion of the separated sulfurized composition in a regeneration zone so as to remove at least a portion of the sulfur contained therein and/or thereon thereby forming a regenerated composition;

d) reducing the regenerated composition in an activation zone so as to provide a reduced composition having a reduced valence promoter content therein which will effect the removal of sulfur from a hydrocarbon stream when contacted with same; and thereafter e) returning at least a portion of the reduced composition to the desulfurization zone.

In step (a), the composition can also comprise, consist of, or consist essentially of manganese oxide, a silicon-containing material, an aluminum-containing material selected from the group consisting of alumina, aluminate and combinations thereof, and a promoter wherein at least a portion of the promoter is present as a reduced valence promoter in an amount which will effect the removal of sulfur from the hydrocarbon stream in a desulfurization zone under conditions such that there is formed a desulfurized hydrocarbon stream and a sulfurized composition.

Other aspects, objectives, and advantages of the present invention will be apparent from the detailed description of the invention and the appended claims.

DETAILED DESCRIPTION OF THE INVENTION

The term "gasoline" denotes a mixture of hydrocarbons boiling in the range of from about 100° F. to about 500° F., or any fraction thereof. Examples of suitable gasoline include, but are not limited to, hydrocarbon streams in refineries such as naphtha, straight run naphtha, coker naphtha, catalytic gasoline, visbreaker naphtha, alkylate, isomerate, reformate, and the like and combinations thereof.

The term "cracked gasoline" denotes a mixture of hydrocarbons boiling in the range of from about 100° F. to about 500° F., or any fraction thereof, that are products from either thermal or catalytic processes that crack larger hydrocarbon molecules into smaller molecules. Examples of suitable thermal processes include, but are not limited to, coking, thermal cracking, visbreaking, and the like and combinations thereof. Examples of suitable catalytic cracking processes include, but are not limited to, fluid catalytic cracking, heavy oil cracking, and the like and combinations thereof. Thus, examples of suitable cracked gasoline include, but are not limited to, coker gasoline, thermally cracked gasoline, visbreaker gasoline, fluid catalytically cracked gasoline, heavy oil cracked gasoline, and the like and combinations thereof. In some instances, the cracked gasoline may be fractionated and/or hydrotreated prior to desulfurization when used as a hydrocarbon stream in the process of the present invention.

The term "diesel fuel" denotes a mixture of hydrocarbons boiling in the range of from about 300° F. to about 750° F., or any fraction thereof. Examples of suitable diesel fuels include, but are not limited to, light cycle oil, kerosene, jet fuel, straight-run diesel, hydrotreated diesel, and the like and combinations thereof.

The term "sulfur" denotes sulfur in any form such as elemental sulfur or a sulfur compound normally present in a hydrocarbon-containing fluid such as cracked gasoline or diesel fuel. Examples of sulfur which can be present during a process of the present invention usually contained in a hydrocarbon stream, include, but are not limited to, hydrogen sulfide, carbonyl sulfide (COS), carbon disulfide ($CS_2$), mercaptans (RSH), organic sulfides (R—S—R), organic disulfides (R—S—S—R), thiophenes, substituted thiophenes, organic trisulfides, organic tetrasulfides, benzothiophenes, alkyl thiophenes, alkyl benzothiophenes, alkyl dibenzothiophenes, and the like and combinations thereof as well as the heavier molecular weights of same which are normally present in a diesel fuel of the types contemplated for use in a process of the present invention, wherein each R can be an alkyl or cycloalkyl or aryl group containing one carbon atom to ten carbon atoms.

The term "fluid" denotes gas, liquid, vapor, and combinations thereof.

The term "gaseous" denotes that state in which the hydrocarbon-containing fluid, such as cracked-gasoline or diesel fuel, is primarily in a gas or vapor phase.

The inventive composition comprises manganese oxide and a promoter.

The inventive composition can also comprise, consist of, or consist essentially of manganese oxide, an aluminum-containing material selected from the group consisting of alumina, aluminate, and combinations thereof, a silicon-containing material, and a promoter.

The term "manganese oxide," as used herein, denotes any oxide of manganese, including, but not limited to, MnO, $Mn_3O_4$, $Mn_2O_3$, $MnO_2$, $MnO_3$, and $Mn_2O_7$.

The silicon-containing material used in the preparation of, and present in the inventive compositions may be either in the form of silica or in the form of one or more silicon-containing materials.

Any suitable source of silicon may be employed in the composition such as, for example, diatomite, expanded perlite, silicalite, silica colloid, flame-hydrolized silica, silica gel, precipitated silica, and the like, and combinations thereof. In addition, silicon compounds that are convertible to silica such as silicic acid, ammonium silicate, and the like, and combinations thereof can also be employed.

More preferably the silicon-containing material is in the form of expanded perlite. The term "perlite" as used herein is the petrographic term for a siliceous volcanic rock, which naturally occurs in certain regions throughout the world. The distinguishing feature, which sets it apart from other volcanic minerals, is its ability to expand four to twenty times its original volume when heated to certain temperatures. When heated above 1600° F., crushed perlite expands due to the presence of combined water with the crude perlite rock. The combined water vaporizes during the heating process and creates countless tiny bubbles in the heat softened glassy particles. The diminutive glass sealed bubbles account for its light weight. Expanded perlite can be manufactured to weigh as little as 2.5 lbs per cubic foot.

The typical elemental analysis of expanded perlite is: silicon 33.8%, aluminum 7%, potassium 3.5%, sodium 3.4%, calcium 0.6%, magnesium 0.2%, iron 0.6%, trace elements 0.2%, oxygen (by difference) 47.5%, and bound water 3%.

Typical physical properties of expanded perlite are: softening point 1600–2000° F., fusion point 2300–2450° F., pH 6.6–6.8, and specific gravity 2.2–2.4.

The term "particulate expanded perlite" or "milled perlite" as used herein denotes that form of expanded perlite which has been subjected to crushing so as to form a particulate mass wherein the particle size of such mass is comprised of at least 97% of particles having a size of less than 2 microns.

The term "milled expanded perlite" is intended to mean the product resulting from subjecting expanded perlite particles to milling or crushing.

The inventive composition contains an aluminum-containing material selected from the group consisting of alumina, aluminate, and combinations thereof. Alumina can be used to produce the composition. The alumina employed in the preparation of the composition can be any suitable commercially available alumina material such as, for example, colloidal alumina solutions, hydrated aluminas, peptized aluminas, and, generally, those alumina compounds produced by the dehydration of alumina hydrates. The preferred alumina is hydrated alumina such as, for example, bohemite or pseudobohemite for best activity and sulfur removal. When the composition is exposed to high temperatures (e.g., during calcinations) at least a portion, preferably a substantial portion of the alumina can be converted to an aluminate.

The term "promoter" denotes any component, which when added to the composition of the present invention, helps promote the desulfurization of hydrocarbon streams. Such promoters can be at least one metal, metal oxide, precursor for the metal oxide, solid solution of more than one metal, or alloy of more than one metal wherein the metal component is selected from the group consisting of nickel, cobalt, iron, manganese, copper, zinc, molybdenum, tungsten, silver, tin, antimony, vanadium, gold, platinum, ruthenium, iridium, chromium, palladium, and combinations of any two or more thereof.

Some examples of promoter metal containing compounds include metal acetates, metal carbonates, metal nitrates, metal sulfates, metal thiocyanates, and the like and combinations thereof. Preferably, the metal of the promoter is selected from the group consisting of nickel, cobalt, nickel-zinc, and combinations of any two or more thereof.

The inventive composition having a reduced valence promoter content is a composition that has the ability to react chemically and/or physically with sulfur. It is also preferable that the inventive composition removes diolefins and other gum forming compounds from cracked gasoline.

The term "metal" denotes metal in any form such as elemental metal or a metal-containing compound.

The term "metal oxide" denotes metal oxide in any form such as a metal oxide or a metal oxide precursor.

During the preparation of a composition of the present invention, the promoter selected from the group consisting of metals, metal oxides, and the like and combinations thereof may initially be in the form of a metal-containing compound and/or a metal oxide precursor. It should be understood that when the promoter is initially a metal-containing compound and/or a metal oxide precursor, a portion of, or all of, such compound and/or precursor may be converted to the corresponding metal or metal oxide of such compound and/or precursor during the inventive process disclosed herein.

Typically, the common oxidation state of the promoter is combined with the manganese oxide portion of the inventive composition. The number of oxygen atoms associated with the promoter must be reduced to form a reduced valence promoter. Consequently, at least a portion of the promoter present in the inventive composition must be present as a reduced valence promoter. While not wishing to be bound by theory, it is believed that the reduced valence promoter can chemisorb, cleave, or remove sulfur. Thus, either the number of oxygen atoms associated with the promoter is reduced or the oxidation state of the promoter is a zero-valent metal. For example, if nickel is the promoter metal, nickel oxide (NiO) can be used and the reduced valence nickel (promoter metal) can be either nickel metal ($Ni^0$) or a non-stoichiometric nickel oxide having a formula of $NiO_{(1-x)}$ wherein $0<x<1$. If tungsten is the promoter, tungsten oxide ($WO_3$) can be used and the reduced valence tungsten (promoter metal) can be either tungsten oxide ($WO_2$), tungsten metal ($W^0$), or a non-stoichiometric tungsten oxide having a formula of $WO_{(3-y)}$ wherein $0<y<3$.

Preferably, the promoter is present in an amount which will effect the removal of sulfur from the hydrocarbon stream when contacted with the inventive composition under desulfurization conditions. Of the total quantity of the promoter present in the inventive composition, it is preferred for at least about 10 weight percent of the promoter to be present in the form of a reduced valence promoter, more preferably at least about 40 weight percent of the promoter is a reduced valence promoter, and most preferably at least 80 weight percent of the promoter is a reduced valence promoter for best activity in sulfur removal. The reduced valence promoter will generally be present in the inventive composition in an amount in the range of from about 1 to about 60 weight percent reduced valence promoter based on the total weight of the inventive composition, preferably in an amount in the range of from about 5 to about 40 weight percent reduced valence promoter, and most preferably in an amount in the range of from 8 to 20 weight percent reduced valence promoter for best activity in sulfur removal. When the promoter comprises a bimetallic promoter, the bimetallic promoter should comprise a ratio of the two metals forming such bimetallic promoter in the range of from about 20:1 to about 1:20.

The manganese oxide will preferably be present in the inventive composition in an amount in the range of from about 10 to about 90 weight percent manganese oxide based on the total weight of the inventive composition, more preferably in an amount in the range of from about 40 to about 80 weight percent manganese oxide, and most preferably in an amount in the range of from about 50 to about 70 weight percent manganese oxide.

The manganese oxide used in the preparation of a composition of the present invention can either be in the form of manganese oxide or in the form of one or more manganese compounds that are convertible to manganese oxide under the conditions of preparation described herein. Examples of suitable manganese compounds include, but are not limited to, manganese sulfide, manganese sulfate, manganese hydroxide, manganese carbonate, manganese acetate, manganese nitrate, and the like and combinations thereof. Preferably, the manganese oxide is in the form of powdered manganese oxide.

The aluminum-containing material will preferably be present in the inventive composition in an amount in the range of from about 1.0 to about 30 weight percent, preferably in an amount in the range of from about 5 to about 25 weight percent, and most preferably, in the range of from 10 to 20 weight percent, based on the total weight of the inventive composition.

The silicon-containing material will preferably be present in the inventive w composition in an amount in the range of from about 10 to about 40 weight percent silicon-containing material based on the total weight of the inventive composition, more preferably in an amount in the range of from about 12 to about 30 weight percent, and most preferably in the range of from 13 to 20 weight percent.

The inventive composition can be a particulate in the form of one of granules, extrudates, tablets, spheres, pellets, or microspheres, preferably, the particulate is a microsphere.

In accordance with the present invention, the inventive composition(s) can be produced by the following inventive process.

In the production of an inventive composition, the composition can generally be prepared by admixing a liquid, manganese oxide, a silicon-containing material, alumina, and a promoter in appropriate proportions by any suitable method or manner which provides for the intimate mixing of such components to thereby provide a substantially homogenous mixture thereof comprising a liquid, manganese oxide, a silicon-containing material, alumina, and a promoter. The term "admixing," as used herein, denotes mixing components in any order and/or any combination or sub-combination. Any suitable means for admixing the components of the inventive composition can be used to achieve the desired dispersion of such components. Examples of suitable admixing include, but are not limited to, mixing tumblers, stationary shelves or troughs, Eurostar mixers, which are of the batch or continuous type, impact mixers, and the like. It is presently preferred to use a Eurostar mixer in the admixing of the components of the inventive composition.

The liquid can be any solvent capable of dispersing manganese oxide, a silicon-containing material, alumina, and a promoter, and, preferably, the liquid can be selected from the group consisting of water, ethanol, acetone and combinations of any two or more thereof. Most preferably, the liquid is water.

The components of the inventive composition are mixed to provide a mixture which can be in the form selected from the group consisting of a wet mix, dough, paste, slurry and the like. Such mixture can then be shaped to form a particulate selected from the group consisting of a granule, an extrudate, a tablet, a sphere, a pellet, or a microsphere. For example, if the resulting mixture is in the form of a wet mix, the wet mix can be densified, dried under a drying condition as disclosed hereinafter, calcined under a calcining condition as disclosed hereinafter, and thereafter shaped, or particulated, through the granulation of the densified, dried, calcined mix to form granulates. Also, for example, when the mixture of the components results in a form of the mixture which is either in a dough state, or a paste state, such mixture can then be shaped, preferably extruded to form a particulate, more preferably a cylindrical extrudate having a diameter in the range of from about 1/32 inch to about 1/2 inch, and any suitable length, preferably a length in the range of from about 1/8 inch to about 1 inch. The resulting particulates, preferably cylindrical extrudates, are then dried under a drying condition as disclosed hereinafter and then calcined under a calcining condition as disclosed hereinafter. More preferably, when the mix is in the form of a slurry, the particulation of such slurry is achieved by spray drying the slurry to form microspheres thereof having a size of about 500 or less microns. Such microspheres are then subjected to drying under a drying condition as disclosed hereinafter and are then calcined under a calcining condition as disclosed hereinafter.

When the particulation is achieved by preferably spray drying, a dispersant component can be utilized and can be any suitable compound that helps to promote the spray drying ability of the mix which is preferably in the form of a slurry. In particular, these components are useful in preventing deposition, precipitation, settling, agglomerating, adhering, and caking of solid particles in a fluid medium. Suitable dispersants include, but are not limited to, condensed phosphates, sulfonated polymers, and combinations thereof. The term "condensed phosphates" refers to any dehydrated phosphate where the $H_2O:P_2O_5$ is less than about 3:1. Specific examples of suitable dispersants include sodium pyrophosphate, sodium metaphosphate, sulfonated styrene maleic anhydride polymer, and combinations thereof. The amount of dispersant component used is generally in the range of from about 0.01 weight percent based on the total weight of the components to about 10 weight percent. Preferably, the amount of the dispersant component used is generally in the range of from about 0.1 weight percent to about 8 weight percent.

In preparing the preferred spray dried composition, an acid component can be used. In general, the acid component can be an organic acid or a mineral acid such as nitric acid.

If the acid component is an organic acid, it is preferred to be a carboxylic acid. If the acid component is a mineral acid, it is preferred to be a nitric acid or a phosphoric acid. Mixtures of these acids can also be used. Generally, the acid is used with water to form a dilute aqueous acid solution. The amount of acid in the acid component is generally in the range of from about 0.01 volume percent based on the total volume of the acid component to about 20 volume percent.

Generally, the spray dried material has a mean particle size in the range of from about 10 micrometers to about 1000 micrometers, preferably in the range of from about 20 micrometers to from about 150 micrometers.

The term "mean particle size" refers to the size of the particulate material as determined by using a RO-TAP® Testing Sieve Shaker, manufactured by W. S. Tyler Inc., of Mentor, Ohio, or other comparable sieves. The material to be measured is placed in the top of a nest of standard 8-inch diameter stainless steel framed sieves with a pan on the bottom. The material undergoes sifting for a period of about 10 minutes; thereafter, the material retained on each sieve is weighed. The percent retained on each sieve is calculated by dividing the weight of the material retained on a particular sieve by the weight of the original sample. This information is used to compute the mean particle size.

The mixture is then dried to form a dried mixture. The drying conditions, as referred to herein, can include a temperature in the range of from about 150° F. to about 450° F., preferably in the range of from about 190° F. to about 410° F. and, most preferably, in the range of from 200° F. to 350° F. Such drying conditions can also include a time period generally in the range of from about 0.5 hour to about 60 hours, preferably in the range of from about 1 hour to about 40 hours, and most preferably, in the range of from 1.5 hours to 20 hours. Such drying conditions can also include a pressure generally in the range of from about atmospheric (i.e., about 14.7 pounds per square inch absolute) to about 150 pounds per square inch absolute (psia), preferably in the range of from about atmospheric to about 100 psia and, most preferably about atmospheric, so long as the desired temperature can be maintained. Any drying method(s) known to one skilled in the art such as, for example, air drying, heat drying, and the like and combinations thereof can be used. Preferably, heat drying is used.

The dried mixture is then calcined to form a calcined mixture. The calcining conditions, as referred to herein, can include a temperature in the range of from about 400° F. to about 1500° F., preferably in the range of from about 800° F. to about 1500° F. and, more preferably, in the range of from 900° F. to 1400° F. Such calcining conditions can also include a pressure, generally in the range of from about 7 psia to about 750 psia, preferably in the range of from about 7 psia to about 450 psia and, most preferably, in the range of from 7 psia to 150 psia, and a time period in the range of from about 1 hour to about 60 hours, preferably for a time period in the range of from about 1 hour to about 20 hours and, most preferably, for a time period in the range of from 1 hour to 15 hours. In the process of this invention, the calcination can convert at least a portion of the alumina to aluminate.

The calcined mixture is thereafter subjected to reduction with a suitable reducing agent, preferably hydrogen or an appropriate hydrocarbon, so as to produce a composition having a substantially reduced valence promoter content therein, preferably a substantially zero-valent promoter content therein, with such zero-valent promoter being present in an amount sufficient to permit the removal of sulfur from a hydrocarbon stream such as cracked gasoline or diesel fuel, according to the process disclosed herein.

The reduction conditions can include a temperature in the range of from about 100° F. to about 1500° F., a pressure in the range of from about 15 psia to about 1500 psia and for a time sufficient to permit the formation of a reduced valence promoter.

The composition is then recovered.

In accordance with the present invention, the inventive composition(s) can also be produced by the following inventive process.

In the production of an inventive composition of the present invention, the composition can generally be prepared by admixing a liquid, manganese oxide, a silicon-containing material, and alumina in appropriate proportions by any suitable methods or manner which provides for the intimate mixing of such components to thereby provide a substantially homogenous mixture comprising a liquid (as described above), manganese oxide, a silicon-containing material, and alumina. Any suitable means for admixing these components, as described above, can be used to achieve the desired dispersant of such components.

The components are mixed to provide a mixture which can be in the form selected from the group consisting of a wet mix, dough, paste, slurry, and the like. Such mixture can then optionally be shaped by densifying, extruding, or spray drying to form a particulate selected from the group consisting of a granule, an extrudate, a tablet, a sphere, a pellet, or a microsphere, as described above.

The mixture is then dried to form a dried mixture, according to the drying conditions described above.

The dried mixture is then calcined to form a calcined mixture according to the calcining conditions described above. This calcining step converts at least a portion of the alumina to aluminate.

The calcined mixture comprising manganese oxide, a silicon-containing material, and alumina (or aluminate), is then incorporated with a promoter. The promoter can be incorporated into or onto the calcined mixture by any suitable means or method known in the art for incorporating a promoter into or onto a substrate material.

A preferred method of incorporating is to impregnate using any standard incipient wetness impregnation technique (i.e. essentially completely or partially filling the pores of a substrate material with a solution of the incorporating elements) for impregnating a substrate. This preferred method uses an impregnating solution comprising the desirable concentration of a promoter so as to ultimately provide a promoted mixture that can then be subjected to drying and calcining followed by reduction with a reducing agent such as hydrogen.

A preferred impregnating solution comprises a solution formed by dissolving a metal containing compound, preferably such metal containing compound is in the form of a metal salt such as a metal chloride, a metal nitrate, a metal sulfate, and the like and combinations thereof, in a solvent such as water, alcohols, esters, ethers, ketones, and combinations thereof. The concentration of the metal promoter in the solution can be in the range of from about 0.1 gram of metal promoter per gram of solution to about 5 grams of metal promoter per gram of solution. Preferably, the weight ratio of metal promoter to the solvent of such solution can be in the range of from about 1:1 to about 4:1 but, more preferably it is in the range of from 1.5:1 to 3:1. It is preferred for the particulates to be impregnated with a nickel component by use of a solution containing nickel nitrate hexahydrate dissolved in water.

Following the incorporating of the calcined mixture, preferably by impregnation, with a promoter, the resulting promoted mixture is then subjected to drying under drying conditions, as described above, and calcined under calcining conditions, as described above, to form a calcined promoted mixture. The calcined promoted mixture can then be subjected to reduction with a reducing agent, as described above, to thereby provide an inventive composition. The composition can then be recovered.

In preparing the spray dried composition, a promoter can be added to the spray dried composition as a component of the original mixture, or it can be added after the original mixture has been spray dried and calcined. If a promoter is added to the spray dried composition after it has been spray dried and calcined, the spray dried composition should be dried and calcined a second time. The spray dried composition is preferably dried a second time at a temperature generally in the range of from about 100° F. to about 650° F. Preferably, the spray-dried composition can be dried a second time at a temperature generally in the range of from about 150° F. to about 600° F. and, more preferably, in the range of from 200° F. to 550° F. The time period for conducting the drying the second time is generally in the range of from about 0.5 hour to about 8 hours, preferably in the range of from about 1 hour to about 6 hours, and more preferably in the range of from 1.5 hours to 4 hours. Such drying a second time is generally carried out at a pressure in the range of from about atmospheric (i.e. about 14.7 psia) to about 100 psia, preferably about atmospheric. This spray dried composition is then calcined, preferably in an oxidizing atmosphere such as in the presence of oxygen or air, under calcining conditions, as described above.

This invention also includes a novel process for the removal of sulfur from a hydrocarbon stream. This process comprises:

a) contacting the hydrocarbon stream with a composition comprising manganese oxide and a promoter wherein at least a portion of the promoter is present as a reduced valence promoter in an amount which will effect the removal of sulfur from the hydrocarbon stream in a desulfurization zone under conditions such that there is formed a desulfurized hydrocarbon stream and a sulfurized composition;

b) separating the desulfurized hydrocarbon stream from the sulfurized composition thereby forming a separated desulfurized hydrocarbon stream and a separated sulfurized composition;

c) regenerating at least a portion of the separated sulfurized composition in a regeneration zone so as to remove at least a portion of the sulfur contained therein and/or thereon thereby forming a regenerated composition;

d) reducing the regenerated composition in an activation zone so as to provide a reduced composition having a reduced valence promoter content therein which will effect the removal of sulfur from a hydrocarbon stream when contacted with same; and thereafter e) returning at least a portion of the reduced composition to the desulfurization zone.

In step (a), the composition can also comprise, consist of, or consist essentially of manganese oxide, a silicon-containing material, an aluminum-containing material selected from the group consisting of alumina, aluminate, and combinations thereof, an aluminate and a promoter wherein at least a portion of the promoter is present as a reduced valence promoter in an amount which will effect the removal of sulfur from the hydrocarbon stream in a desulfurization zone under conditions such that there is formed a desulfurized hydrocarbon stream and a sulfurized composition.

The contacting, in step a), of the hydrocarbon stream with the inventive composition in the desulfurization zone can be by any method known to those skilled in the art.

The desulfurization zone can be any zone wherein desulfurization of a hydrocarbon stream can take place. Examples of suitable zones are fixed bed reactors, moving bed reactors, fluidized bed reactors, transport reactors, and the like. Presently a fluidized bed reactor or a fixed bed reactor is preferred.

The desulfurization zone of step a) includes the following conditions: total pressure, temperature, weight hourly space velocity, and hydrogen flow. These conditions are such that the inventive composition can desulfurize the hydrocarbon stream to produce a desulfurized hydrocarbon stream and a sulfurized composition.

The total pressure can be in the range of from about 15 pounds per square inch absolute (psia) to about 1500 psia. However, it is presently preferred that the total pressure be in a range of from about 50 psia to about 500 psia.

In general, the temperature should be sufficient to keep the hydrocarbon stream in essentially a vapor or gas phase. While such temperatures can be in the range of from about 100° F. to about 1000° F., it is presently preferred that the temperature be in the range of from about 400° F. to about 800° F. when treating a cracked-gasoline, and in the range of from about 500° F. to about 900° F. when treating a diesel fuel.

Weight hourly space velocity ("WHSV") is defined as the numerical ratio of the rate at which a hydrocarbon stream is charged to the desulfurization zone in pounds per hour at standard conditions at temperature and pressure (STP) divided by the pounds of composition contained in the desulfurization zone to which the hydrocarbon stream is charged. In the practice of the present invention, such WHSV should be in the range of from about 0.5 hr.$^{-1}$ to about 50 hrs.$^{-1}$, preferably in the range of from about 1 hr.$^{-1}$ to about 50 hrs.$^{-1}$.

Any suitable hydrocarbon stream, which comprises, consists of, or consists essentially of sulfur containing hydrocarbons can be used as the feed to be contacted with the inventive composition. The hydrocarbon stream preferably comprises, consists of, or consists essentially of a fuel selected from the group consisting of a cracked gasoline, diesel fuel, and combinations thereof.

The amount of atomic sulfur, as sulfur in the hydrocarbon stream can be in the range of from about 100 ppm atomic sulfur by weight of the hydrocarbon stream to about 50,000 ppm. When the hydrocarbon stream is cracked gasoline, the amount of atomic sulfur can be in the range of from about 100 ppm atomic sulfur by weight of the cracked gasoline to about 10,000 ppm sulfur by weight of the cracked gasoline. When the hydrocarbon stream is diesel fuel, the amount of atomic sulfur can be in the range of from about 100 ppm atomic sulfur by weight of the diesel fuel to about 50,000 ppm sulfur by weight of the diesel fuel.

As used herein, "sulfur" used in conjunction with "ppmw sulfur" or the term "atomic sulfur", denotes the amount of atomic sulfur (about 32 atomic mass units) in the sulfur-containing fluid, not the atomic mass, or weight, of a sulfur compound, such as an organo-sulfur compound.

The cracked gasoline or diesel fuel, suitable as a feed in a process of the present invention, is a composition that contains, in part, olefins, aromatics, sulfur, paraffins and naphthenes.

The amount of olefins in cracked gasoline is generally in the range of from about 10 to about 35 weight percent olefins based on the total weight of the cracked gasoline. For diesel fuel there is essentially no olefin content.

The amount of aromatics in cracked gasoline is generally in the range of from about 20 to about 40 weight percent aromatics based on the total weight of the cracked gasoline. The amount of aromatics in diesel fuel is generally in the range of from about 10 to about 90 weight percent aromatics based on the total weight of the diesel fuel.

In carrying out the desulfurization step of a process of the present invention, it is preferred that the hydrocarbon stream be in a gas or vapor phase. However, in the practice of the present invention, it is not essential that such hydrocarbon stream be totally in a gas or vapor phase.

In carrying out the desulfurizing step, it is presently preferred that an agent be employed which interferes with any possible chemical or physical reacting of the olefinic or aromatic compounds in the hydrocarbon stream which is being treated with the inventive composition. Preferably such agent is hydrogen.

Hydrogen flow in the desulfurization zone is generally such that the mole ratio of hydrogen to the hydrocarbon stream is the range of from about 0.1 to about 10, preferably in the range of from about 0.2 to about 3.

If desired, during the desulfurization of the cracked gasoline or diesel fuel, diluents such as methane, carbon dioxide, flue gas, nitrogen, and the like and combinations thereof can be used. Thus, it is not essential to the practice of the present invention that a high purity hydrogen be employed in achieving the desired desulfurization of the hydrocarbon stream such as, but not limited to, cracked gasoline or diesel fuel.

It is presently preferred when utilizing a fluidized bed reactor system that a composition be used having a particle size in the range of from about 10 micrometers to about 1000 micrometers. Preferably, such composition should have a particle size in the range of from about 20 micrometers to about 500 micrometers, and, more preferably, in the range of from 30 micrometers to 400 micrometers. When a fixed bed reactor system is employed for the practice of a desulfurization process of the present invention, the composition should generally have a particle size in the range of about 1/32 inch to about 1/2 inch diameter, preferably in the range of from about 1/32 inch to about 1/4 inch diameter.

It is further presently preferred to use a composition having a surface area in the range of about 1 square meter per gram ($m^2/g$) to about 1000 square meters per gram of composition, preferably in the range of from about 1 $m^2/g$ to about 800 $m^2/g$.

The desulfurized hydrocarbon stream can be separated from the sulfurized composition by any appropriate separation method known in the art thereby forming a separated desulfurized hydrocarbon stream and a separated sulfurized composition.

Examples of such means are cyclonic devices, settling chambers, impingement devices for separating solids and gases, and the like and combinations thereof. Separation can include, but is not limited to, allowing the hydrocarbon stream to flow out of the desulfurization zone. The desulfurized gaseous cracked gasoline or desulfurized gaseous diesel fuel, can then be recovered and preferably liquefied. Liquification of such desulfurized hydrocarbon streams can be accomplished by any manner known in the art.

The amount of sulfur in the desulfurized hydrocarbon stream, following treatment in accordance with a desulfurization process of the present invention, is less than about 300 ppm sulfur by weight of hydrocarbon stream, preferably less than about 150 ppm sulfur by weight of hydrocarbon stream, and more preferably less than about 50 ppm sulfur by weight of hydrocarbon stream.

In carrying out the process of the present invention, if desired, a stripper unit can be inserted before and/or after the regeneration of the sulfurized composition. Such stripper will serve to remove a portion, preferably all, of any hydrocarbon from the sulfurized composition. Such stripper can also serve to remove oxygen and sulfur dioxide from the system prior to the introduction of the regenerated composition into the activation zone (i.e., reduction zone). The stripping comprises a set of conditions that include total pressure, temperature, and a stripping agent partial pressure.

Preferably, the total pressure in the stripper when employed is in the range of from about 25 psia to about 500 psia.

Temperature for such stripping can be in the range of from about 100° F. to about 1000° F.

The stripping agent is a composition that helps to remove hydrocarbon from the sulfurized composition. Preferably, the stripping agent is nitrogen. The sulfurized composition can have sulfur contained therein (for example, within the pores of the composition) or thereon (for example, located on the surface of the composition).

The regeneration zone employs a set of conditions that includes total pressure and sulfur removing agent partial pressure. The total pressure is generally in the range of from about 25 psia to about 50 psia.

The sulfur removing agent partial pressure is generally in the range of from about 1% to about 25% of the total pressure.

The sulfur-removing agent is a composition that helps to generate gaseous sulfur containing compounds and oxygen containing compounds such as sulfur dioxide, as well as to burn off any remaining hydrocarbon deposits that might be present. The preferred sulfur removing agent suitable for use in the regeneration zone is selected from oxygen containing gases such as, but not limited to, air.

The temperature in the regeneration zone is generally in the range of from about 100° F. to about 1500° F., preferably in the range of from about 800° F. to about 1200° F.

The regeneration zone can be any vessel wherein the desulfurizing or regeneration of the sulfurized composition can take place.

The regenerated composition is then reduced in an activation zone with a reducing agent including, but not limited to, hydrogen, so that at least a portion of the promoter content of the composition is reduced to produce a reduced composition having a reduced valence promoter content to permit the removal of sulfur from the hydrocarbon stream according to the inventive process disclosed herein.

In general, when practicing the present invention, deactivation, i.e., reduction, of the desulfurized composition is carried out at a temperature in the range of from about 100° F. to about 1500° F. and at a pressure in the range of from about 15 psia to about 1500 psia. Such reduction is carried out for a time sufficient to achieve the desired level of promoter reduction of the promoter, which is preferably contained in the skin of the composition. Such reduction can generally be achieved in a time period in the range of from about 0.01 hour to about 20 hours.

Following the activation, i.e., reduction, of the regenerated composition, at least a portion of the resulting reduced composition can be returned to the desulfurization zone.

In carrying out the process of the present invention, the steps of desulfurization, regeneration, reduction, and optionally stripping before and/or after such regeneration can be accomplished in the single zone or vessel or in multiple zones or vessels.

When carrying out the process of the present invention in a fixed bed reactor system, the steps of desulfurization, regeneration, reduction, and optionally stripping before and/or after such regeneration are accomplished in a single zone or vessel.

The desulfurized cracked gasoline can be used in the formulation of gasoline blends to provide gasoline products suitable for commercial consumption and can also be used where a cracked gasoline containing low levels of sulfur is desired.

The desulfurized diesel fuel can be used in the formulation of diesel fuel blends to provide diesel fuel products.

EXAMPLES

The following examples are intended to be illustrative of the present invention and to teach one of ordinary skill in the art to make and use the invention. These examples are not intended to limit the invention in any way.

Example I

A manganese/alumina/perlite composition promoted with cobalt was prepared. 176 grams of cobalt nitrate hexahydrate were added to 242 grams of deionized water and mixed in a Eurostar mixer. To this solution, 25.5 grams of Condea Disperal alumina (an acid dispersible boehmite alumina) were slowly added while mixing continued. 100.2 grams of manganese oxide ($Mn_2O_3$) and 25.5 grams of perlite (Sibrico Sil-Kleer #27-M) were dry mixed and added to the solution of cobalt and alumina. After mixing thoroughly, the solution was put into a muffle furnace. The temperature was increased 3 degrees °C. per minute to 150° C. and held there for an hour. The temperature was then increased to 635° C. and held there for an hour. After cooling, the sample was crushed, sized between 840 and 1700 microns, and then tested. Analysis of this sample is given in Table V.

Example II

The cobalt composition as prepared in Example I was tested for its desulfurization ability as follows. 10 grams of the composition as prepared were placed in a ½ inch diameter quartz tube having a length of about 12 inches and having a glass frit positioned above the lower one-third so as to provide an inert support for the bed of sorbent.

During each reaction cycle, the reactor was maintained at a temperature of 750° F. and a pressure of 15 pounds per square inch absolute (psia). Hydrogen flow was at 130 standard cubic centimeters per minute (sccm) diluted with 130 sccm of nitrogen. Gaseous cracked-gasoline was pumped upwardly through the reactor at a rate of 13.4 ml per hour. Such conditions are hereinafter referred to as "reaction conditions."

The gaseous cracked-gasoline had a motor octane number of 80.5 (MON) or 91.4 (RON) by engine tests, an olefin content of 20.4 weight percent, 340 parts per million (ppm) sulfur by weight sulfur-compounds based on the total weight of the gaseous cracked-gasoline with about 95 weight percent of the sulfur in the form of thiophenic compounds.

Before Cycle 1 was initiated, the composition was reduced with hydrogen flowing at a rate of 300 sccm at a temperature of 750° F. for a period of one hour. Such conditions are hereinafter referred to as "reducing conditions." Each reaction cycle consisted of four hours with the product sulfur (ppm) for each cycle measured after two, three, and four hours of exposure to the feed.

After completion of the reaction cycle, the composition was flushed with nitrogen at 750° F. for fifteen minutes. The temperature was then raised to 1000° F. where the composition was regenerated under 100 sccm air and 200 sccm nitrogen for two hours. The temperature was then decreased to 750° F. and the sample purged with nitrogen for 15 minutes. Such conditions are hereinafter referred to as "regeneration conditions." Cycle 2 began, like Cycle 1 under reducing conditions; i.e., with treatment at 750° F. of the sorbent in hydrogen at a flow rate 300 sccm for one hour.

The composition in Example I was tested over three reaction cycles with regeneration occurring after Cycle 1 and Cycle 2. The results in Table I were obtained where the values given are the parts per million by weight of sulfur in the product after the second hour, third hour, and fourth hour of treatment, respectively. It should be noted that this composition showed greater than 90% desulfurization activity even after two regenerations of the composition.

TABLE I

| Time | Cycle 1 (ppm S) | Cycle 2 (ppm S) | Cycle 3 (ppm S) |
| --- | --- | --- | --- |
| Second Hour | 9 | 16 | 27 |
| Third Hour | 10 | 19 | 32 |
| Fourth Hour | 6 | 19 | 35 |

Table VI summarizes the effect of the cobalt promoted manganese composition upon octane number change. The change in RON and MON is calculated from gas chromatographic analysis of the feed and product samples. The results clearly demonstrate that these cobalt promoted compositions are expected to lead to very small octane changes even at high desulfurization activity.

Example III

A manganese/alumina/perlite composition promoted with nickel was prepared. 176.3 grams of nickel nitrate hexahydrate were added to 58 grams of deionized water and mixed in a Eurostar mixer. To this solution, 25.6 grams of Condea Disperal alumina (an acid dispersible boehmite alumina) were slowly added while mixing continued. 100.0 grams of manganese oxide ($Mn_2O_3$) and 25.5 grams of perlite (Sibrico Sil-Kleer #27-M) were dry mixed and added to the solution of nickel and alumina. After mixing thoroughly, the solution was put into a muffle furnace. The temperature was increased 3 degrees °C. per minute to 150° C. and held there for an hour. The temperature was then increased to 635° C. and held there for an hour. After cooling, the sample was crushed, sized between 840 and 1700 microns, and then tested. Analysis of this sample is given in Table V.

Example IV 10 grams of the composition as prepared in Example III were tested for desulfurization activity as described in Example II. The composition was tested over three reaction cycles with the results in Table II given in parts per million by weight of sulfur in the product after the second hour, third hour, and fourth hour of treatment, respectively. It should be noted that the nickel promoted composition demonstrates exceptionally high desulfurization activity, especially during the first reaction cycle.

TABLE II

| Time | Cycle 1 (ppm S) | Cycle 2 (ppm S) | Cycle 3 (ppm S) |
|---|---|---|---|
| Second Hour | <1 | 11 | 15 |
| Third Hour | <1 | 19 | 39 |
| Fourth Hour | <1 | 31 | 57 |

Table VI summarizes the effect of the nickel promoted manganese composition upon octane number change. The change in RON and MON is calculated from gas chromatographic analysis of the feed and product samples. The data demonstrate that small octane changes are expected even at high desulfurization activity over these nickel promoted compositions.

Example V

A manganese/alumina/perlite composition promoted with nominal (90/10) weight ratio of nickel and zinc was prepared. First, a nickel oxide and zinc oxide mixture was prepared by dissolving 453 grams of nickel nitrate hexahydrate and 47 grams of zinc nitrate hexahydrate in distilled water. This was then blended with a solution containing 200 grams ammonium carbonate in a Eurostar mixer. A nickel/zinc/oxide precipitate was then formed which was filtered through a Buchner funnel and dried overnight in a muffle furnace at 635° C. To prepare the composition, 15.0 grams of Vista Dispal alumina was blended with water in a Eurostar mixer. 50.2 grams of manganese oxide ($Mn_2O_3$), 27.5 grams of the nickel/zinc mixture, and 15.0 grams of perlite (Silbrico Sil-Kleer #27-M) were dry mixed and added to the alumina. After mixing thoroughly, the solution was put into a muffle furnace and dried overnight at 635° C. After cooling, the sample was crushed, sized between 840 and 1700 microns, and then tested. The elemental analysis is given in Table V.

Example VI 10 grams of the composition as prepared in Example V were tested for desulfurization activity as described in Example II. The composition was tested over three reaction cycles with the results in Table III given in parts per million by weight of sulfur in the product after the second hour, third hour, and fourth hour of treatment, respectively. The amount of sulfur removed was in the range of from about 39% to about 89%.

TABLE III

| Time | Cycle 1 (ppm 5) | Cycle 2 (ppm S) | Cycle 3 (ppm S) |
|---|---|---|---|
| Second Hour | 37 | 73 | 89 |
| Third Hour | 72 | 144 | 177 |
| Fourth Hour | 138 | 206 | 194 |

Table VI summarizes the effect of the 90/10 nickel/zinc promoted manganese composition upon octane number change. The change in RON and MON average is calculated from gas chromatographic analysis of the feed and product samples. The data demonstrate that small octane changes are expected even when 75% of the feed sulfur is removed over these 90/10 nickel/zinc promoted compositions.

Example VII

A manganese/alumina/perlite composition promoted with nominal (70/30) weight ratio of nickel and zinc was prepared. First, a nickel oxide and zinc oxide mixture was prepared. 720 grams of nickel nitrate hexahydrate and 290 grams of zinc nitrate hexahydrate were dissolved in distilled water. This was then blended with a solution of 390 grams of ammonium carbonate in a Eurostar mixer. A nickel/zinc/oxide precipitate was then formed which was filtered through a Buchner funnel and dried overnight in a muffle furnace at 635° C. To prepare the composition, 18.1 grams of Vista Dispal alumina was blended with water in a Eurostar mixer. 50.5 grams of manganese oxide ($Mn_2O_3$), 42.3 grams of the nickel/zinc mixture, and 18.0 grams of perlite (Silbrico Sil-Kleer #27-M) were dry mixed and added to the alumina. After mixing thoroughly, the solution was put into a muffle furnace and dried overnight at 635° C. After cooling, the sample was crushed, sized between 840 and 1700 microns, and then tested. The elemental analysis is given in Table V.

Example VIII 10 grams of the composition as prepared in Example VII were tested for desulfurization activity as described in Example II. The composition was tested over three reaction cycles with the results in Table IV given in parts per million by weight of sulfur in the product after the second hour, third hour, and fourth hour of treatment, respectively. The amount of sulfur removed was in the range of from about 67% to about 97%.

TABLE IV

| Time | Cycle 1 (ppm S) | Cycle 2 (ppm S) | Cycle 3 (ppm S) |
|---|---|---|---|
| Second Hour | 9 | 24 | 61 |
| Third Hour | 16 | 64 | 96 |
| Fourth Hour | 31 | 101 | 112 |

Table VI summarizes the effect of the 70/30 nickel/zinc promoted manganese composition upon octane number change. The change in RON and MON average is calculated from gas chromatographic analysis of the feed and product samples. The data demonstrate that small octane changes are expected even at high desulfurization activity over these 70/30 nickel/zinc promoted compositions.

TABLE V

Elemental Analyses of Compositions (Wt %) by X-ray Fluorescence

| Element | Example I | Example III | Example V | Example VII |
|---|---|---|---|---|
| Silicon | 7.2 | 7.3 | 7.8 | 6.7 |
| Aluminum | 8.1 | 6.6 | 12.8 | 10.3 |
| Manganese | 35.1 | 37.6 | 33.3 | 26.7 |
| Cobalt | 14.5 | — | — | — |
| Nickel | — | 16.3 | 9.4 | 16.6 |
| Zinc | — | — | 1.5 | 7.7 |

TABLE VI

Change in Octane Number and Percent Sulfur Removed
for Manganese Oxide Compositions for Product Taken After Third Hour

| Example | Cycle | Promoter | Percent Sulfur Removed | Octane Change* |
|---|---|---|---|---|
| II | 1 | Cobalt | 97.1 | −0.24 |
| II | 2 | Cobalt | 94.5 | +0.08 |
| IV | 2 | Nickel | 94.5 | −0.12 |
| VI | 1 | 90/10 Nickel/Zinc | 78.9 | +0.08 |
| VIII | 1 | 70/30 Nickel/Zinc | 95.3 | −0.05 |

*Change in (RON + MON)/2

That which is claimed:

1. A composition consisting of:
  (a) manganese oxide;
  (b) a silicon-containing material;
  (c) an aluminum-containing material selected from the group consisting of alumina, aluminate, and combinations thereof;
  (d) a promoter
wherein said promoter comprises a metal selected from the group consisting of nickel, cobalt, iron, manganese, copper, silver, tin, antimony, gold, platinum, ruthenium, iridium, palladium, and combinations of any two or more thereof; and
wherein said composition has been reduced with a suitable reducing agent under suitable conditions so that at least a portion of said promoter is present as a zero valence promoter, and wherein said promoter is present in an amount which will effect the removal of sulfur from a hydrocarbon stream when contacted with said composition under desulfurization conditions.

2. A composition in accordance with claim 1 wherein said manganese oxide is present in an amount in the range of from about 10 to about 90 weight percent.

3. A composition in accordance with claim 1 wherein said manganese oxide is present in an amount in the range of from about 40 to about 80 weight percent.

4. A composition in accordance with claim 1 wherein said manganese oxide is present in an amount in the range of from 50 to 70 weight percent.

5. A composition in accordance with claim 1 wherein said promoter is present in an amount in the range of from about 1 to about 60 weight percent.

6. A composition in accordance with claim 1 wherein said promoter is present in an amount in the range of from about 5 to about 40 weight percent.

7. A composition in accordance with claim 1 wherein said promoter is present in an amount in the range of from 8 to 20 weight percent.

8. A composition in accordance with claim 1 wherein said silicon-containing material is present in an amount in the range of from about 10 to about 40 weight percent and said aluminum-containing material is present in an amount in the range of from about 1 to about 30 weight percent.

9. A composition in accordance with claim 1 wherein said silicon-containing material is present in an amount in the range of from about 12 to about 30 weight percent and said aluminum-containing material is present in an amount in the range of from about 5 to about 25 weight percent.

10. A composition in accordance with claim 1 wherein said silicon-containing material is present in an amount in the range of from 13 to 20 weight percent and said aluminum-containing material is present in an amount in the range of from 10 to 20 weight percent.

11. A composition in accordance with claim 1 wherein said promoter comprises nickel.

12. A composition in accordance with claim 1 wherein said promoter comprises cobalt.

13. A composition in accordance with claim 1 wherein said silicon-containing material is present in the form of expanded perlite.

14. A composition in accordance with claim 13 wherein said expanded perlite is milled.

15. A composition in accordance with claim 1 wherein said composition is a particulate in the form of one of granules, extrudates, tablets, spheres, pellets, or microspheres.

16. A composition in accordance with claim 15 wherein said particulate is a microsphere.

17. A composition in accordance with claim 1 wherein said suitable conditions comprise a temperature in the range of from about 100° F. to about 1500° F. and at a pressure in the range of from about 15 to 1500 psia for a time sufficient to permit the formation of a zero valence promoter.

* * * * *